United States Patent [19]

Hellerman

[11] Patent Number: 4,486,126
[45] Date of Patent: Dec. 4, 1984

[54] PNEUMATIC CONVEYOR FOR SILAGE AND HAYLAGE

[75] Inventor: John Hellerman, Rte. 2, Melrose, Minn. 56352

[73] Assignee: John Hellerman, Melrose, Minn.

[21] Appl. No.: 387,435

[22] Filed: Jun. 11, 1982

[51] Int. Cl.³ .......................................... B65G 53/46
[52] U.S. Cl. ..................... 406/67; 222/345; 241/282.2
[58] Field of Search ................... 406/63–68, 406/52, 71, 135; 222/345, 346; 241/101 A, 167, 282.1, 282.2, 292.1

[56] References Cited

U.S. PATENT DOCUMENTS

| | | | |
|---|---|---|---|
| 2,324,574 | 7/1943 | Gans | 222/346 X |
| 2,622,341 | 12/1952 | Finnegan | 222/345 X |
| 2,890,079 | 6/1959 | Stumpf | 406/67 |
| 2,903,302 | 9/1959 | Ross | 406/67 |
| 4,111,493 | 9/1978 | Sperber | 406/65 X |

FOREIGN PATENT DOCUMENTS 701901 12/1979 U.S.S.R. ................. 406/67

Primary Examiner—Jeffrey V. Nase
Attorney, Agent, or Firm—Peterson, Palmatier, Sturm Sjoquist & Baker, Ltd.

[57] ABSTRACT

A pneumatic conveying apparatus for silage and haylage, including long conveying ducts to carry the air stream with haylage and silage entrained therein. A positive displacement pump produces a flow of significant quantities of air to an air lock. The air lock has a rotor with blades traveling around the cylindrical peripheral wall and end wall defining traveling air lock compartments, the peripheral wall has an opening at its upper portion defining a feed throat receiving silage and haylage from a raised hopper. A high speed rotary impeller rotor at one side of the feed throat propells the silage-haylage into the air lock compartment. The rotor has sharp edged blades wiping along the edges of the air lock rotor blades and a boundary edge of the feed opening of the air lock. The peripheral wall of the air lock housing and the wall of the high speed impeller housing define the boundary edge across which the sharpened blades of the rotary impeller wipe to cut and remove silage and haylage as it moves through the feed throat.

7 Claims, 5 Drawing Figures

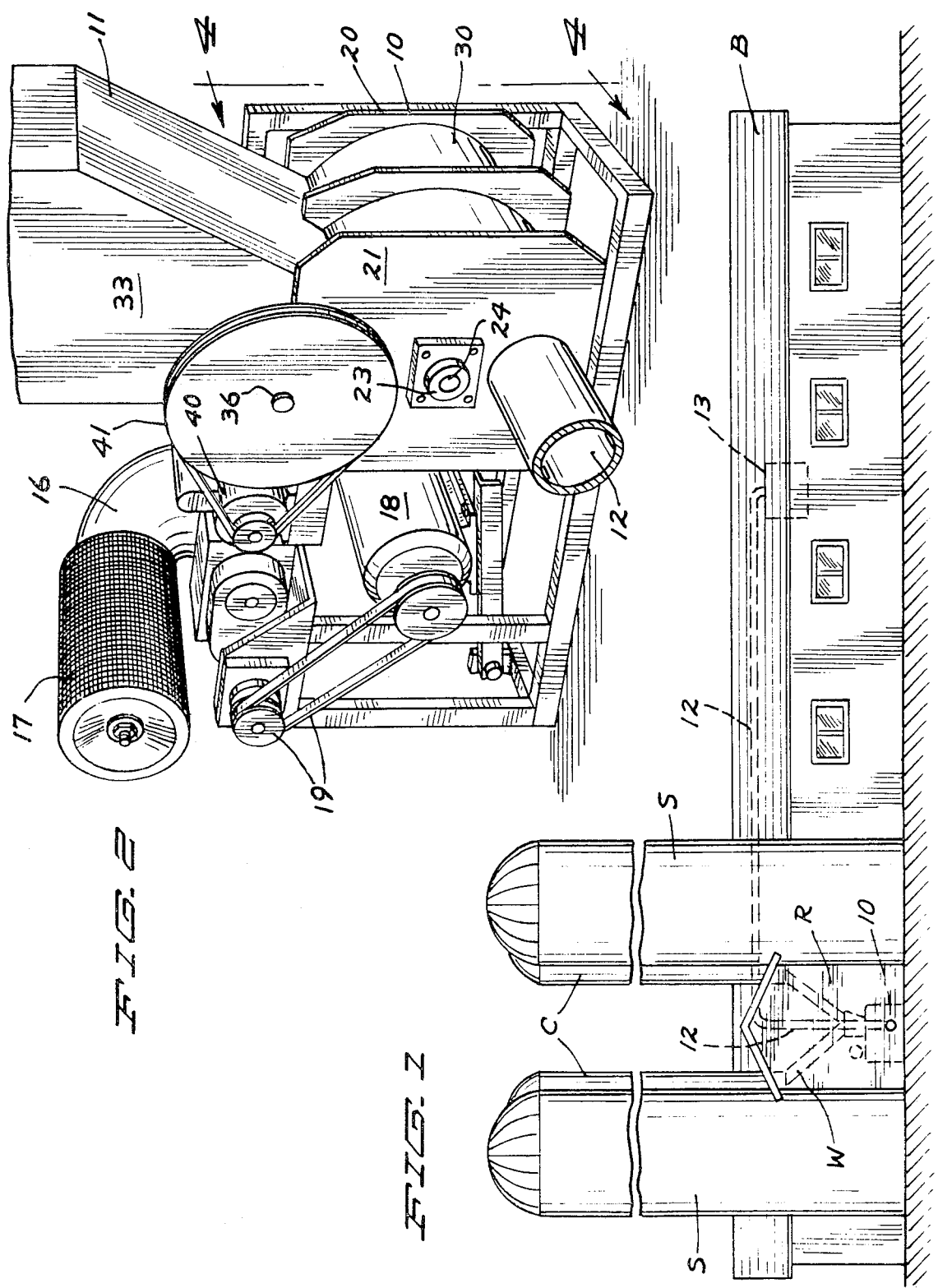

PNEUMATIC CONVEYOR FOR SILAGE AND HAYLAGE

This invention relates to a pneumatic silage and haylage conveyor.

BACKGROUND OF THE INVENTION

In feeding cattle, especially dairy cattle, feeding of silage and haylage is a common practice, but until this time, there has been no satisfactory apparatus for pneumtically conveying such silage and haylage for substantial distances. It will be recognized that silage is usually considered to be corn, harvested early while the stems, leaves, and ears are still green and soft, and the corn, harvested in this way, is chopped and blown into a silo. Haylage is somewhat generally similar, but is hay which has been harvested while it is still relatively green and high moisture, and the hay is chopped into particles and then blown into the silo. Of course, when the silage and haylage is removed from the silo, it must be conveyed to the cattle for feeding, either in stanchions, feed bunks, or similar type feeding devices. Various types of carts, auger conveyors, and belt conveyors have been used in conveying silage and haylage.

Of course, pneumatic conveyors have been previously used for conveying various granular and powder type materials, all of which have a relatively low moisture content at the time they are being used or conveyed. However, silage and haylage is generally relatively wet as it is taken from a silo and then used as cattle feed. For instance, haylage and silage may be as wet as 70% moisture, and often times the haylage and silage is well in excess of 40% moisture. In some instances, the silage may be less than 40% moisture, but it is unusual that such haylage have the low moisture content comparable to bailed hay, which may be in the range of 20% moisture.

Corn silage is generally made up of fairly uniform size particles; but on the other hand, haylage is not uniform like corn silage, and the stems and particles vary rather widely in size. For instance, in haylage, it is not at all uncommon that the stems and particles vary from one-fourth of an inch to one inch in length.

In addition to the other particles in corn silage, often times there is shelled corn mixed in with the silage with a rather high moisture content of 23% or more.

The high moisture content, variable moisture content, and the irregular particle size of haylage, and the high moisture content of silage, makes these materials difficult to handle without stopping in the flow lines in a pneumatic system.

SUMMARY OF THE INVENTION

An object of the invention is to provide a haylage and silage pneumatic conveying system of new and novel construction.

Another object of the invention is to provide a novel haylage and silage conveying system which readily accommodates the high moisture and widely variable moisture conditions found in much of the material being handled, but which will also accommodate low moisture material without bridging or otherwise causing the system to be plugged.

An important feature of the present invention is the positive displacement pump and air lock which delivers the silage and haylage into the air stream from the positive displacement pump, together with a high speed rotary impeller at the material inlet of the air lock for the purpose of flinging the haylage into the air lock pockets, wiping the blade edges of the air lock rotor for maintaining such blade edges clear of haylage and similar debris, cutting and wiping the haylage off critical stationary parts in the inlet system, and preventing any bridging of the haylage at the inlet throat from which haylage is supplied into the air lock. In addition, the high speed rotary impeller breaks up any chunks that may exist in the haylage being supplied into the air lock so that only smaller particles are being pneumatically conveyed by the air from the positive displacement pump.

Advantages obtained by the invention are that the silage and haylage which is taken from the silo is immediately dropped into the conveying system and conveyed to the desired locations of use. In some instances, the silage and haylage will be dropped directly into a feed bunk; in other instances, the silage or haylage will be supplied into a mixer where other feed and supplements may be proportioned into it. The haylage or silage will be conveyed by the pneumatic conveying system around several 90° bends in the duct, which may be as long as 100 to 150 feet, or more. Continuous flow of material has been experienced under widely varying conditions of the haylage. The material may be either extremely wet or relatively dry, or may be frozen. Any chunks that exist in the haylage withdrawn from the silo are broken up. No bridging of materials has been experienced, nor has plugging of the ducts occurred. In addition, there is essentially no possibility of any reverse flow of air in the system.

BRIEF DESCRIPTION OF THE DRAWINGS

FIG. 1 is an elevation view of a cattle barn incorporating the present invention.

FIG. 2 is a perspective view of the apparatus producing the pneumatic conveying.

DETAILED SPECIFICATION

Figure 3:
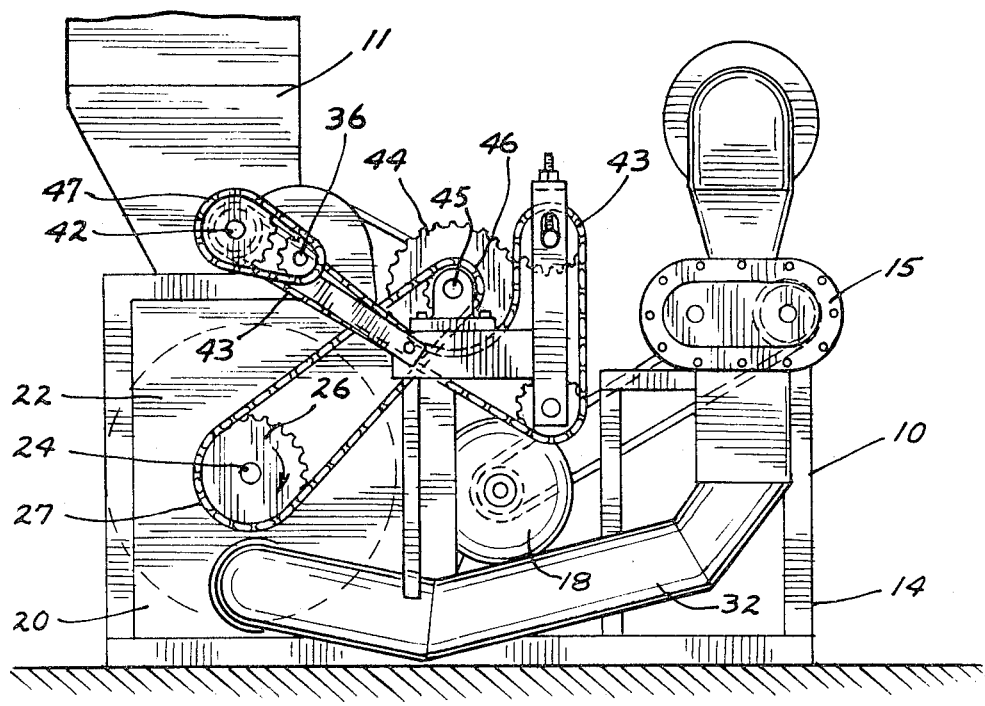
FIG. 3 is an elevation view of the opposite side of the apparatus of FIG. 2.

One form of the invention is shown in the drawings and is described herein.

FIG. 1 illustrates a cattle barn B with considerable length and existing adjacent a pair of silos S in which silage and haylage are stored. In this particular illustrated building arrangement, a small shed or room R is built between the silos S, into which the silage may be dropped as it is removed from the silo. The chutes C of the silos may be used to drop the silage or haylage down from the upper portions of the silo and the silage-haylage is fed or directed by the chutes C and duct work W into the input hopper 11 of the machine 10 which is located in the room R. Of course, other suitable gravity flow or other conveying apparatus may be utilized to supply the silage-haylage into the hopper 11.

As will be described in detail hereafter, the machine 10 produces flow of air through a long duct system 12 in the barn B for delivering the silage-haylage to remote locations. In this particular installation, the duct work 12 delivers the silage-haylage to a feed mixer 13 suspended in the ceiling or rafter structure of the barn B and then from there, the feed will be distributed to the feed bunks or stanchions in the barn for feeding the cattle housed therein.

The machine 10 performs the function of producing flow of air in the duct work 12, and causing significant quantities of silage-haylage to be entrained in the flowing air. The air and silage-haylage handling machine 10 has a frame 14 upon which a positive displacement air pump 15 is mounted. The air pump 15 has an air inlet duct 16 to which an air filter 17 is attached.

The positive displacement pump 15 is driven by an electric motor 18, and connected thereto by a pulley and belt system 19.

An air lock 20 is carried on the frame, and has end walls 21 and 22, mounting bearings 23 for the shaft 24 of the air lock rotor, indicated in general by numeral 25.

The air lock rotor 25 is driven by the shaft 24 at a speed of approximately 20 rpm from a sprocket 26 and chain 27. The air lock rotor has a multiplicity of radially extending blades 28 defining air lock chambers or compartments 29 therebetween. In the form shown, there are six such air lock blades 28 on the rotor 25, and six air lock compartments.

The air lock 20 also has a peripheral wall 30 welded and sealed to the end walls 21 and 22.

The blades 28 of the air lock rotor have end edges which abut against the inner surfaces of the end walls 21 and 22 as to seal tightly against these end walls and minimize any transfer of air between adjacent compartments 29 which may have different static air pressures therein.

The radially outward edges of the rotor blades 28 confront the peripheral wall 30 in close fitting relation and have rubber sealing edges of blades 31 which actually engage and bear against the peripheral wall 30 as the blades revolve in the air lock housing in order to minimize air leakage between adjacent compartments 29. The rubber edges or blades 31 are adjustably connected to the rigid blades 28 as to permit inward and outward adjustment of the rubber blades to share continued sealing efficiency between adjacent compartments.

An air supply duct 32 is connected to the outlet or discharge of the positive displacement air pump 15 for conveying air to the air lock housing. The duct 32 is connected into and through the end wall 22 of the air lock housing at a location below the rotor shaft 24 for directing air under significant pressure into the housing at this location.

Figure 4:
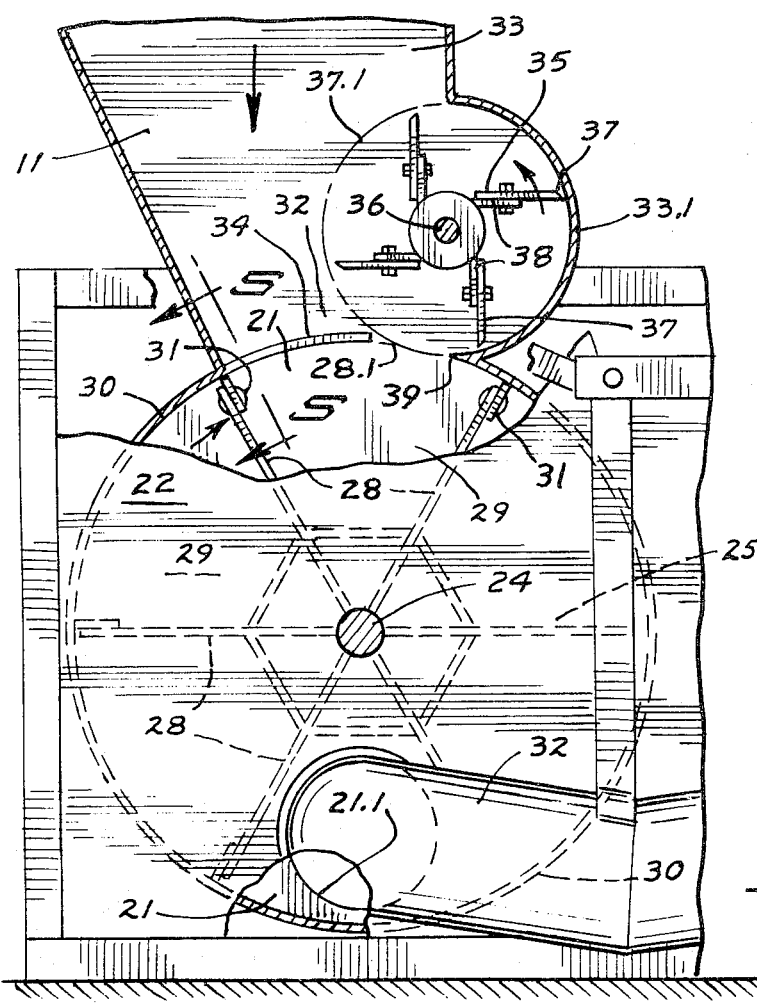
FIG. 4 is a detail elevation view, partly broken away and shown in section and illustrating the present invention.
Figure 5:
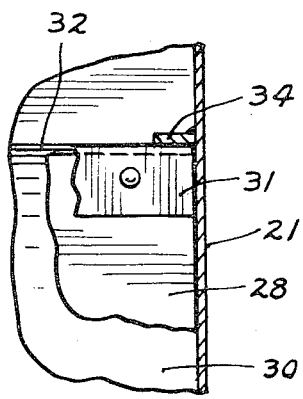
FIG. 5 is an enlarged detail section view taken approximately at 5—5 of FIG. 4.

The other end wall 21 of the air lock has an opening therethrough which connects to the end of the conveying duct 12 which serves to carry the air and silage-haylage long distances throughout the cattle barn. The opening in end wall 21 is seen in FIG. 4 and is designated by the numeral 21.1.

An opening 32 in the upper portion of the peripheral wall 30 provides for supply of haylage-silage into the air lock housing. The opening 32 provides a feed throat connecting the hopper 11 to the air lock housing. At the transverse sides of the opening 32, a pair of flanges 34 are affixed as by welding to the end walls 21 and 22. These flanges 34 for the purpose of minimizing possibility of silage-haylage moving downwardly from the hopper 11 into the spaces between the end edges of the rotor blades 28 and the end walls 21, 22.

At one side of the supply opening or feed throat 32 a high speed impeller rotor 35 is mounted for rotation with shaft 36 which is carried in bearings on the end walls 33 of the hopper.

The high speed rotor 35 revolves at a speed of about 400 rpm and has a multiplicity of sharp edged blades 37 thereon. The sharp edged blades 37 are carried on mounting blades 38 so that the sharp edged blades 37 can be adjusted inwardly and outwardly slightly and the connection is made by suitable clamping bolts.

The high speed impeller rotor 35 is partially confined in a semi-circular housing 33.1 at one side of the hopper 11. The housing 33.1 is rigidly connected to the peripheral wall 30 of the air lock so as to define a very narrow edge 39 at the location where the walls 30 and 33.1 merge with each other. The blades 37 revolve in very close tolerance relation with the edge 39 as to repeatedly and continuously wipe against the edge 39, thereby preventing any collection of silage and haylage at this boundary edge 39 of the receiving opening 32. The sharp edged blades 37 cut any fragments of haylage or silage that may tend to hesitate at the edge 39 and thereby keep the edge completely clear of silage and haylage. The blades 37 may have a more widely spaced relation with the inner periphery of the wall 33.1 because there is essentially no silage or haylage at the inner periphery of wall 33.1 and essentially no tendency for silage-haylage to get hung up inside the wall 33.1.

It will also be noted that the orbit 37.1 of the sharp edges of blades 37 is substantially tangent with the orbit 28.1 of the rotor blades 28 so that the high speed rotary sharp edged blades 37 will continuously and repeatedly wipe against and along and across the rubber edges or tips 31 of the air lock blades 28. This wiping of the high speed rotor blades 37 across the air lock blades prevents the collection of any silage and haylage on the air lock blades, which would otherwise permit leakage of air between adjacent air lock compartments 29.

It will also be recognized that the blades 37 of the high speed impeller rotor engage the silage and haylage falling downwardly through the hopper and toward the opening or feed throat 32 and cause the silage and haylage to be thrown with force into each of the air lock compartments 29 as the compartment traverses the feed throat or opening, thereby filling the air lock compartments to the maximum extent.

Of course, the high speed impeller rotor 35 tends to break up any chunks of silage and haylage which may move downwardly through the hopper. Occasionally, such chunks will be propelled against the edge 39 and thereby be broken up and portions of such chunks may move around within the orbit of the rotor 35 and be propelled downwardly again into an air lock compartment.

A second motor 40 on the frame of the machine is connected by a pulley and belt drive 41 to the high speed rotary shaft 36. The other end of shaft 36 is connected by a chain and sprocket 47 to an idler shaft 42 on which a sprocket drives another chain 43 which is trained around a large sprocket 44 affixed on a jack shaft 45 which drives a sprocket 46, around which the chain 27 is trained for driving the air lock rotor 25.

This pneumatic conveyor for silage and haylage carries the silage and haylage through the barn for a distance of approximately 112 to 115 feet along the duct 12. The duct is approximately four inches in diameter and the bends in the duct have a five foot radius. There are two such 90 degree bends in the duct 12 and no clogging has occurred. As previously described herein, the silage and haylage varies widely in its nature and its moisture content, but without any adverse effects in terms of the conveying of this material. The high speed impeller rotor 35 rapidly propels the silage-haylage downwardly through the throat area 32 and into the air lock compartment 29. The revolving air lock rotor 25 carries the compartment full of silage-haylage down to the lower portion of the air lock where the silage-haylage is entrained in the air stream.

The high speed impeller rotor 35 causes the sharp edges of the blades 37 to wipe along the rubber tips 31 of the air lock blades 28 to keep these blades clean and to prevent any silage-haylage to be lodged on these edges; and the sharp edges of blades 37 also rapidly traverse the edge 39 many times while one compartment 29 full of silage-haylage passes along the edge 39 so as to keep the edge free and clear of silage-haylage and prevent any material from being caught by the air lock rotor which next traverses the edge 39. It has been found that the compartments 29 are substantially completely filled with the silage-haylage so that the air from duct 32 and pump 15 entrain a continuous stream of silage-haylage moving along the duct 12. It will be recognized that the arrangement of the inlet duct 32 and the outlet opening 21.1, which are in line with each other in the end walls 21 and 22, allows at least two of the air lock rotor blades 28 to be in sealing relation with the peripheral wall on each side of the inlet and outlet openings of the air lock.

It will be seen that the present invention provides, in conjunction with the air lock rotor and positive displacement pump for producing the stream of air through the air lock, a high speed rotary impeller with sharp edged blades which traverse and wipe against the stationary edge between the housing of the high speed rotor and the peripheral housing of the air lock, and also across the tip edges of the air lock blades which traverse the feed throat or receiving opening of the air lock.

What is claimed is:

1. Apparatus for pneumatic conveying of silage-haylage comprising
   duct means for confining the flow of air under pressure and carrying significant quantities of silage-haylage,
   an air pump means generating significant air pressure to establish the flow in the duct means,
   an air lock between the pump means and duct means and in air flow communication therewith, the air lock having a housing confining a revolving air lock rotor having a generally cylindrical peripheral wall and opposed end walls, the end walls having lower portions with aligned air ports therein and respectively connected with the pump means and duct means in air flow relation, said air lock rotor having spaced rotary blades defining material carrying chambers therebetween, the blades having outer edges moving along the peripheral wall of the housing in close fitting air sealing relation and revolving in a direction to move the rotary blades across a receiving opening in an upper portion of the peripheral wall and across a downstream boundary edge of the receiving opening,
   guide means above the receiving opening in the peripheral wall and defining a silage-haylage feed throat through which such silage-haylage is directed through the receiving opening and into the air lock housing, and
   a high speed rotary impeller in the feed throat and having impeller blades swinging downwardly to impel the silage-haylage into the air lock housing and swinging across the boundary edge in the same direction as said air lock rotor and in closely spaced relation therewith to wipe the edge free of silage-haylage.

2. The silage-haylage pneumatic conveying apparatus according to claim 1 and the air lock rotor and impeller rotor having substantially parallel axes.

3. The silage-haylage pneumatic conveying apparatus according to claim 2 and the air lock rotor and impeller rotor revolving in oppossite directions.

4. The silage-haylage pneumatic conveying apparatus according to claim 3 and the edges of the air lock rotor blades and the edges of the impeller rotor blades moving in orbits which substantially adjoin each other at the receiving opening of the peripheral wall.

5. The silage-haylage pneumatic conveying apparatus according to claim 1 and said boundary edge of the receiving opening being linear and lying substantially parallel to the axis of rotation of the air lock rotor.

6. The silage-haylage pneumatic conveying apparatus according to claim 1 and the air lock rotor having a plurality of spaced rotary blades with outer edges sealing against the peripheral wall and the blades defining material carrying chambers therebetween, the receiving opening having length, in a direction circumferentially of the peripheral wall, not greater than the spacing between adjacent air lock rotor blade edges.

7. Apparatus for pneumatic conveying of silage-haylage, comprising
   duct means for confining the flow of air under pressure and carrying significant quantities of silage-haylage,
   air pump means generating significant air pressure to establish the flow in the duct means,
   an air lock between the pump and duct means and in air flow communication therewith, the air lock having a housing confining a revolving air lock rotor and having a generally cylindrical peripheral wall and opposed end walls, the end walls having lower portions with aligned air ports therein and respectively connected with the pump and duct means in air flow relation, the peripheral wall having an upper portion with a silage-haylage receiving opening therein and having a boundary edge downstream of said rotor at one side of the opening,
   guide means above the opening in the peripheral wall and defining a silage-haylage feed throat through which such silage-haylage is directed through the receiving opening and into the air lock housing,
   and a high speed rotary impeller in the feed throat and having impeller blades swinging downwardly in the feed throat to impel the silage-haylage downwardly into the air lock housing adjacent to and swinging across the boundary edge in the same direction as said air lock rotor at said silage-haylage receiving opening.

* * * * *